US012595164B2

(12) United States Patent
Welch et al.

(10) Patent No.: US 12,595,164 B2
(45) Date of Patent: Apr. 7, 2026

(54) METHODS AND APPARATUS FOR DISPENSING AT MULTIPLE DISPENSING POINTS

(71) Applicant: Lancer Corporation, San Antonio, TX (US)

(72) Inventors: Tyler Welch, San Antonio, TX (US); Robert Louis Robinson, Universal City, TX (US)

(73) Assignee: Lancer Corporation, San Antonio, TX (US)

( * ) Notice: Subject to any disclaimer, the term of this patent is extended or adjusted under 35 U.S.C. 154(b) by 0 days.

(21) Appl. No.: 18/634,897

(22) Filed: Apr. 13, 2024

(65) Prior Publication Data

US 2024/0351855 A1 Oct. 24, 2024

Related U.S. Application Data

(60) Provisional application No. 63/460,346, filed on Apr. 19, 2023.

(51) Int. Cl.

| | |
|---|---|
| ***B67D 1/12*** | (2006.01) |
| ***B67D 1/00*** | (2006.01) |
| ***B67D 1/08*** | (2006.01) |

(52) U.S. Cl.

CPC ......... *B67D 1/1234* (2013.01); *B67D 1/0024* (2013.01); *B67D 1/0894* (2013.01)

(58) Field of Classification Search

CPC ... B67D 1/0024; B67D 1/1234; B67D 1/0894

See application file for complete search history.

(56) References Cited

U.S. PATENT DOCUMENTS

| | | | | | |
|---|---|---|---|---|---|
| 5,105,859 | A | | 4/1992 | Bennett et al. | |
| 5,168,905 | A | | 12/1992 | Phallen | |
| 5,950,691 | A | * | 9/1999 | Abe .......................... | B65B 3/32 141/183 |
| 6,148,877 | A | * | 11/2000 | Bethke ...................... | B65B 3/28 141/196 |
| 2005/0145293 | A1 | | 7/2005 | Jenkins et al. | |
| 2012/0012227 | A1 | | 1/2012 | Schubert et al. | |

OTHER PUBLICATIONS

PCT/US2024/024521. International Search Report, Written Opinion of the ISA, and the examiner's search strategy and results.

* cited by examiner

*Primary Examiner* — Timothy L Maust

(74) *Attorney, Agent, or Firm* — Christopher L. Makay

(57) ABSTRACT

A dispensing system (10) and related methods are provided in which a cup (22) is partially filled with a beverage at a first dispensing point (14*a*), and the cup is topped-off at a second dispensing point (14*b*).

12 Claims, 2 Drawing Sheets

METHODS AND APPARATUS FOR DISPENSING AT MULTIPLE DISPENSING POINTS

CROSS-REFERENCE TO RELATED APPLICATION AND PRIORITY INFORMATION

This application claims the benefit of and priority from prior filed U.S. provisional application No. 63/460,346, entitled "Methods and Apparatus for Dispensing at Multiple Dispensing Points", filed Apr. 19, 2023, which is incorporated herein by reference in its entirety.

TECHNICAL FIELD OF THE INVENTION

This invention relates generally to dispensing, and particularly to methods and apparatus for dispensing with at multiple dispensing points.

BACKGROUND OF THE INVENTION

In dispensing fizzy (or otherwise foaming) beverages, such as, without limitation, carbonated beverages, foam is produced when dispensing occurs at common dispense flow rates. To fill a cup (or other vessel into which the beverage is dispensed) to its final desired volume without overflow, it is often necessary to first partially fill the cup, wait for foam to subside, and then fill again (this subsequent filling is referred to as "topping-off"). In fact, in some cases it may be desirable to wait for foam to subside from this second filling and top-off again, and even this may have to be repeated. All fillings of the cup after the initial pour, individually and collectively, are referred to as topping-off, whether for foaming or non-foaming drinks. In existing automated beverage dispensing systems, topping-off reduces throughput.

SUMMARY OF THE INVENTION

In accordance with the teachings of the present invention, methods and apparatus for dispensing at multiple dispensing points are provided which eliminate or substantially reduce problems associated with prior art systems.

In particular, a method of dispensing beverages comprises dispensing a first volume of a first beverage into a first vessel at a first dispensing point, the first volume being less than a final beverage volume, automatically moving the first vessel from the first dispensing point to a second dispensing point, and topping-off the first vessel to the final beverage volume by dispensing more of the first beverage into the first vessel at a second dispensing point.

In one embodiment, dispensing the first volume takes an initial pour time, automatically moving takes a movement time, and topping-off takes a topping-off time, and wherein the movement time and the topping-off time together are less than or equal to the initial pour time.

In one embodiment, automatically moving the first vessel comprises advancing a conveyor on which the first vessel rides. Also, the method may further comprise positioning a plurality of additional vessels on the conveyor, wherein advancing the conveyor moves the additional vessels. In this embodiment, advancing the conveyor moves one of the additional vessels to the first dispensing point.

In one embodiment, the method further comprises dispensing a second beverage into a second vessel at the first dispensing point, wherein the second beverage is not available at the second dispensing point. In another embodiment, the method further comprises dispensing a second beverage into a second vessel at the second dispensing point, wherein the second beverage is not available at the first dispensing point.

The method may further comprise automatically moving a second vessel to the first dispensing point and dispensing a second beverage into the second vessel at the first dispensing point at least partially while topping-off the first vessel. Also, the method may comprise automatically moving the second vessel from the first dispensing point to the second dispensing point and topping-off the second vessel by dispensing more of the second beverage into the second vessel at the second dispensing point.

A beverage dispensing system is also provided, comprising a controller; a first dispensing point operable, under control of the controller, to dispense a first volume of a first beverage into a first vessel, the first volume being less than a final beverage volume; a conveyor operable, under control of the controller, to move the first vessel to a second dispensing point after the first volume of the first beverage is dispensed into the first vessel; and the second dispensing point operable, under control of the controller, to top-off the first vessel to the final beverage volume by dispensing more of the first beverage into the first vessel.

In one embodiment of this system, the first dispensing point dispenses the first volume in an initial pour time, the conveyor moves the first vessel in a movement time, and the second dispensing point tops-off the first vessel in a topping-off time, and wherein the movement time and the topping-off time together are less than or equal to the initial pour time.

The system may further comprise a plurality of additional vessels on the conveyor, with the conveyor operable to move one of the additional vessels to the first dispensing point.

In one embodiment, the first dispensing point is operable to dispense a second beverage into a second vessel, and the second beverage is not available at the second dispensing point. In another embodiment, the second dispensing point is operable to dispense a second beverage into a second vessel, and the second beverage is not available at the first dispensing point.

In a particular embodiment, each dispensing point comprises a respective multi-flavor nozzle.

In another embodiment, a method of dispensing beverages comprises dispensing a first beverage into a first vessel at a first dispensing point, automatically moving the first vessel from the first dispensing point to a second dispensing point and a second vessel to the first dispensing point, topping-off the first vessel by dispensing more of the first beverage into the first vessel at the second dispensing point, and dispensing a second beverage into the second vessel at the first dispensing point at least partially while topping-off the first vessel.

In one embodiment dispensing the first beverage takes an initial pour time, automatically moving the first vessel takes a movement time, and topping-off takes a topping-off time, and wherein the movement time and the topping-off time together are less than or equal to the initial pour time.

Automatically moving the first and second vessels may comprise advancing a conveyor on which the first and second vessels ride.

In one embodiment of this method, the second beverage is not available at the second dispensing point.

Important technical advantages are provided by the present invention. In particular, and without limitation, dispensing throughput is increased with the present invention by partially filling a vessel at a first dispensing point, and then completing the dispense at another dispensing point. The present invention eliminates or substantially reduces delays associated with waiting for foam to subside when pouring foaming beverages in automated systems. Another important advantage is that any beverage, whether foaming or not, may be partially filled at more one dispensing point, and filled to its final volume at another dispensing point, thereby increasing throughput in automated systems. Still another important technical advantage of the present invention is its ability to allow operators to balance their beverage variety offering with pouring throughput increases.

BRIEF DESCRIPTION OF THE DRAWINGS

Reference is made in the description to the following briefly described drawings, which are not drawn to scale, and in which like reference numerals indicate like features.

DETAILED DESCRIPTION OF THE INVENTION

Figure 1:
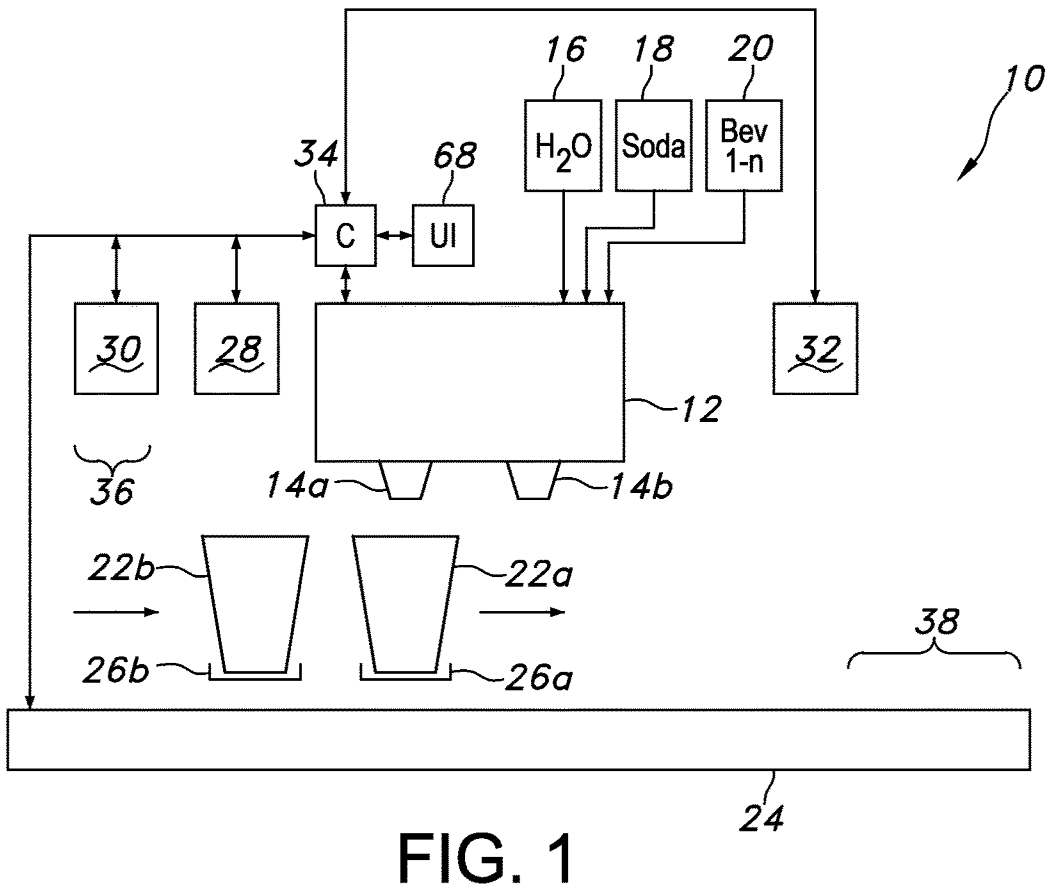
FIG. 1 is a block diagram of one embodiment of a dispensing system according to certain aspects of the present invention.

FIG. 1 illustrates one embodiment of a dispensing system 10 according to certain aspects of the present invention. In the example embodiment of FIG. 1, dispensing system 10 is a beverage dispensing system; however, the present invention is not limited to beverage dispensing, and may be employed with virtually any dispenser or system that employs topping-off.

The present invention is discussed in connection with an automated beverage dispensing system, which may be fully or partly automated. It is contemplated that its most likely application will be "crew serve", in which beverages are prepared and served to customers. However, it may also be used in a self-serve environment.

Beverage dispensing system 10 includes a dispenser 12 having a plurality of dispensing points 14 at which beverages are dispensed. In the illustrated embodiment, two dispensing points 14*a* and 14*b* are shown, but any number greater than 1 may be employed.

Beverage dispenser 12 is coupled to a supply of plain water 16, a supply of carbonated water 18, and to a plurality of beverage components 20. Beverage dispenser may also produce its carbonated water in the dispenser from the plain water supply 16. Furthermore, a mechanism for producing other foamy drinks, such as a nitrogen infusing system, may also be provided. As will be discussed in more detail below, finished beverages are formed by dispensing water (plain or carbonated) and one or more beverage components at the dispensing points 14.

Beverages are dispensed into cups 22 at dispensing points 14. Although cups are shown, any suitable vessel may be used. For illustrative purposes, FIG. 1 shows two cups, cups 22*a* and 22*b*. Cups 22 are moved under dispensing points 14*a* and 14*b* for filling with the appropriate beverage, as will be discussed below. Moving the cups 22 under the dispensing points 14 may be accomplished in any suitable manner, but preferably with a conveyor 24. In one particular embodiment, cups 22 are carried on conveyor 24 in carriers (or cup holders) 26, which are coupled to the conveyor 24. Although two cups 22*a* and 22*b* and two carriers 26*a* and 26*b* are shown, any number of cups and carriers may be moved on the conveyor 24.

The beverage system 12 may also include other elements, such as ice dispensing point 28 at which ice may be dispensed into the cups 22, a cup loading unit 30 for automatically loading cups onto conveyor 24 (for example, into carriers 26), and lidding or sealing station 32 for applying lid or seals to cups 22.

Beverage dispensing system 10 is operated under control of controller 34. Controller 34 is any suitable controller, for example, and without limitation, a microprocessor-based control system, and may be centralized, distributed, or any combination thereof, and may be part of dispenser 12, remote from dispenser 12, or partly local and partly remote. Controller 34 performs various control functions, including, without limitation, causing ordered (or otherwise selected) beverages to be dispensed and conveyor 24 to advance. To perform this control, controller 34 is coupled to various elements of dispensing system 10 as will be discussed below. Controller 34 is operable, among other things, to control dispensing system 10 to dispense various sizes of beverages (e.g., without limitation, small, medium, large, extra-large), different amounts of ice, and mixed beverage flavors (e.g., without limitation, a combination of cola and root beer).

In the illustrated embodiment, controller 34 controls the conveyor 24 so that the cups 22 move in-step along the path of conveyor 24, sequentially moving to and from various functional positions, such as, without limitation, from a cup loading position 36 (in which cups may be manually placed on the conveyor 24 or automatically placed such as with cup loading unit 30) to ice dispensing position 28, to under dispensing point 14*a*, to under dispensing point 14*b*, to the lidding/sealing station 32, and then to one or more user-access positions 38. The controller 34 operates to advance the conveyor 24, and thereby the cups 22, after the function (at the active functional positions) that takes the longest to perform is completed.

With sequential cup conveying, pouring throughput is limited by the time it takes to pour a drink. For example, with a single dispensing point, it may take 9 seconds to pour a fizzy drink into a large cup: 5 seconds for the initial pour, 3 seconds to wait for foam to subside, and 1 second of top-off. The cup is then moved from the dispensing point, and the next cup advanced for pouring. Ignoring how long it takes to move the full cup and advance the next-to-be-filled cup, throughput is one drink each 9 seconds for such beverages. Furthermore, with non-foaming beverages (for example a beverage based on plain water), it may take 6 seconds to fill a large cup.

With the multiple dispensing points 14 of the current invention, however, throughput is increased. Following with the same example fizzy beverage and large cups, with the current invention, the first dispensing point 14*a* is used to pour the initial pour (5 seconds) into cup 26*a*, and the cup 26*a* is moved to the next dispensing point 14*b*. During movement and while under the dispensing point 14*b*, foam subsides and the top-off pour is performed, again taking 9 seconds to fully fill the first cup 26*a*. However, the second cup 26*b* is brought under dispensing point 14*a* and is initially filled while cup 26*a*'s foam subsides and cup 26*a* is topped-off. The second cup 26*b* is likewise advanced to the second dispensing point 14*b* after its 5-second initial pour. Thus, after the first drink, ignoring cup movement times, throughput is one drink each 5 seconds (even though it only takes 4 seconds to wait for foam to subside and to perform top-off, throughput would still be 5 seconds in this example, because the cups are not advanced until the longest activity is completed—in this example, the 5-second initial pour). Provided that the time to advance a cup from the first to the second dispensing point is less than the time allowed for foam to subside before topping-off, pouring throughput will usually be determined by the longest pouring-related activity.

Furthermore, some drinks may be non-foaming, and in processing such non-foaming beverages with the present invention, throughput can be maintained or increased by dispensing less than the full amount at the first dispensing point and completing the dispense at the second dispensing point. For example, if it takes 6 seconds to pour a large non-foaming drink, the system may be operated to pour this drink for 1 to 5 seconds at the first dispensing point, then top-off the remaining volume at the second dispensing point to maintain at least a 5 second throughput (which would be desirable if the subsequent drink is a large foaming drink with a 5-second initial pour as in the previous example). Dispensing the entire non-foaming drink at one dispensing point would slow throughput by one second, in this example with the subsequent large, foaming drink.

It may be desirable in many cases, in a two dispensing-point system, to equally divide the time a cup spends at each dispensing point (if beverage is to be dispensed into the cup at both dispensing points). Using the examples discussed above, for example, 3 seconds each for a large non-foaming drink, and 4.5 seconds each for a large foaming drink. However, other divisions of time are within the scope of the present invention.

The times of the examples discussed are example times only, and are not meant to define how long pouring, foam subsiding, or topping-off takes. Such times are related to many factors, including, without limitation, the foaming intensity of the beverage, the amount and kind of ice, the flow rate of the dispense, the nozzle characteristics, the temperature of the dispensed beverage, and the size of the cup.

Depending on the size of the cups and the intensity of foaming, and the nature of subsequent drinks to be processed, to increase throughput it may be desirable to perform more or less pouring at the first nozzle, and more or less topping-off at the second nozzle. Any such optimizing of throughput is within the scope of the present invention.

Another advantage of the present invention is that it allows beverage dispenser operators to better balance the number of beverage flavor choices with speed of operation of the dispensing system 10. Multiple beverage flavors (for example, without limitation, colas, diet colas, root beer, lemon-lime beverages, sports drinks, energy drinks, lemonade, tea, etc., along with bonus flavor shots, such as, without limitation, cherry or lime flavors) are dispensed at each beverage dispensing point 14. As one non-limiting example, each beverage dispensing point 14 may support twelve different flavors. If an operator desires maximum flavor choice, then no flavors would be duplicated at the dispensing points. However, this maximum flavor choice prevents topping-off with the same beverage flavor at another dispensing point 14 (top-off could occur with another flavor). Because most beverage orders are of a single (not mixed) flavor, speed of operation is increased by using the present invention's approach of initially pouring at 4 one dispensing point, and topping-off at another dispensing point. To take most advantage of the throughput advantages of the present invention, at least some beverage flavors should be duplicated at the dispensing points 14. In particular, duplicating the most common beverage flavor choices (for example, cola and diet cola in a venue where those are most common) allows the topping-off speed advantage of the present invention. With the present invention, an operator may choose which flavors to duplicate, and thereby balance the variety of choices offered with speed of operation.

Also, a mixed beverage comprising a mixture of flavors may be made by dispensing one or more of the flavors at one dispensing point, and one or more other flavors at the next dispensing point. Thus, even if flavors are not duplicated at multiple dispensing points, a mixed beverage of the flavors available at each dispensing point is may nonetheless by produced with the present invention by dispensing from both dispensing points.

Figure 2:
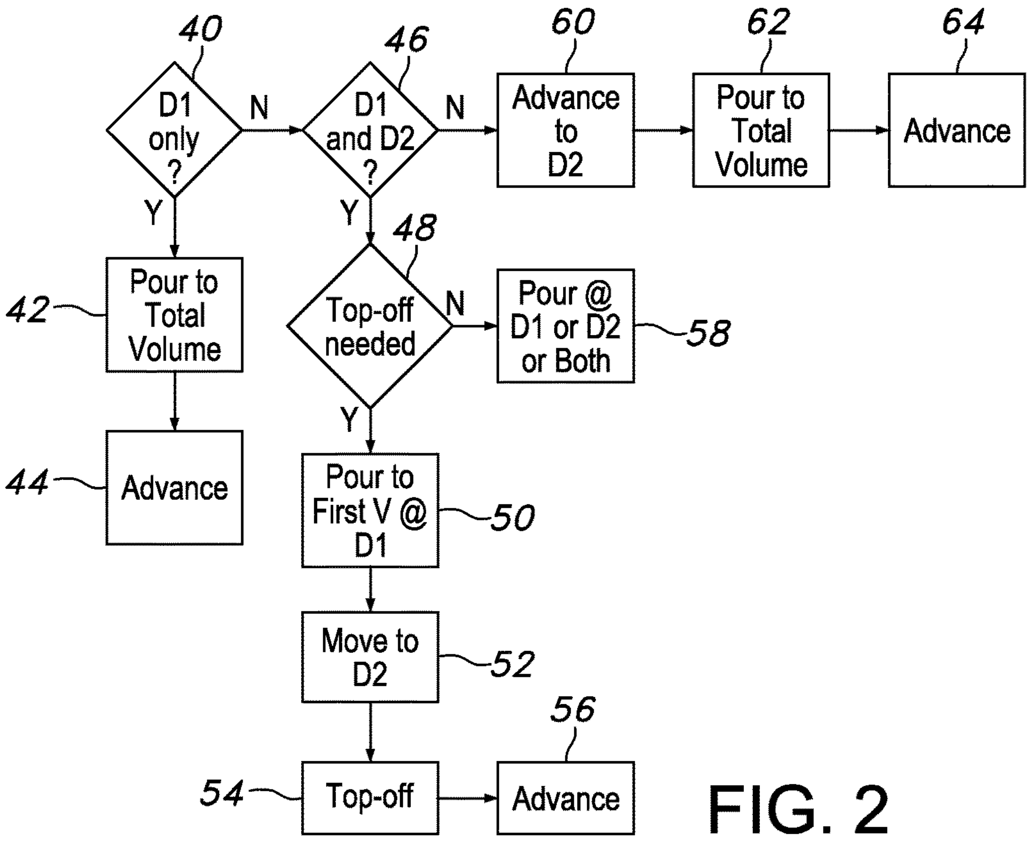
FIG. 2 is a schematic representation of one method of performing the present invention.

FIG. 2 is a schematic representation of one method of performing the present invention in connection with system having two dispensing points 14. For a beverage order to be processed, the method begins at decision block 40, wherein it is determined if the flavor to be poured is available only at the first dispensing point (14*a* of FIG. 1). If it is available only at the first dispensing point, then, as shown by block 42, the beverage is poured to the total volume required for the order, which may involve an initial pour and topping-off, depending on the nature of the beverage being poured. After the final beverage volume is reached, the cup is advanced at block 44.

In describing the advancing (moving) cups in this method, each time a cup is advanced, advancement will occur after active processing at other functional positions is complete.

If at decision block 40 it is determined that the beverage is not only available at the first dispensing point, it is determined at decision block 46 whether the beverage is available at both dispensing points. If it is available at both, then it is determined at decision block 48 whether top-off is needed.

If top-off is needed, then at block 50 an initial pour of a first volume of the ordered beverage is poured into the cup, the first volume being less than the final beverage volume. At block 52, the cup is advanced to the second dispensing point. As represented by block 54, top-off filling is performed at the second dispensing point until the final beverage volume has been reached (top-off may include one or more dispenses), and the cup is advanced at block 56. If top-off is not needed (as determined at decision block 48), then as represented by block 58, pouring of the total beverage volume May occur at the first or second dispensing point, or a combination of both, which decision may be made, without limitation, for convenience or depending on optimal throughput determinations.

If at decision block 46 it is determined that the ordered beverage is not available at both dispensing points, then it is only available at the second dispensing point, and the cup is advanced to the second dispensing point (block 60). At block 62 the beverage is poured to the total volume required for the order, which may involve an initial pour and topping-off, depending on the nature of the beverage being poured. After the final 23 beverage volume is reached, the cup is advanced at block 64.

Controller 34 may operate, and the methods of the present invention carried out, in various ways to select the order in which beverages are poured. For example and without limitation, beverage orders may be processed in the order they are received, or processed at a time when other items of the same order are ready or soon-to-be-ready (for example and without limitation, food items), or processed in a sequence that optimizes throughput (taking into account, for example and without limitation, whether the ordered beverage is available at multiple dispensing points, and the number and kind of orders presently to be processed), or any combination of these options.

In a preferred embodiment, each dispensing point 14 comprises a nozzle though which beverages are dispensed. Such a nozzle is preferably a multi-flavor nozzle suitable for dispensing a plurality of beverages. It should be understood, however, that the dispensing points 14 may comprise any suitable mechanism for dispensing beverages, with or without a nozzle.

It is contemplated that the present invention will be primarily carried out in a system that conveys cups in step-wise motions, each cup moving at the same time, substantially the same distance. However, the present invention may be used in systems in which one or more of the cups are moved independently of or not in step with other cups.

Figure 3:
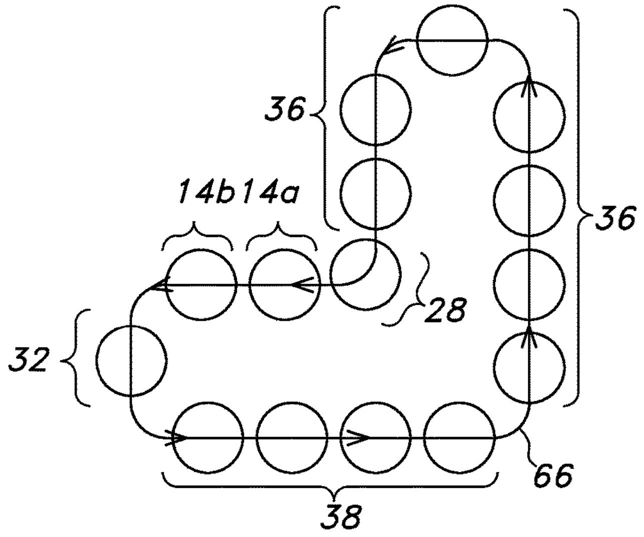
FIG. 3 is a schematic representation of one particular conveying path.

FIG. 3 is a schematic top-view representation of one particular conveyor path 66 (with direction arrows), showing cups 22 (each of the circles represents a cup 22) and various functional positions. Although cups are shown all along the conveyor path 66, gaps may occur, for example if cups are not loaded at every opportunity for cup loading. Controller 34 keeps track of the location and status of each cup and operates dispensing system 10 accordingly. Any suitable conveyor and path may be used.

A user interface 68 (shown in FIG. 1), which communicates with controller 34, represents any suitable interface for accepting orders (or otherwise selecting drinks), whether placed remotely or at the dispenser 12 or both. For example, and without limitation, user interface 68 may comprise any one or more of the following: a user interface on the dispenser 12, a point-of-sale system, a web site, or a customer app residing on a customer-operated device (such as a mobile device or a tablet, without limitation), or any combination thereof.

User interface 68 may couple with controller 34 in any suitable way, including, without limitation, with a wired or wireless connection, directly or indirectly through intermediate systems (such as, without limitation, servers, a local network, or the internet).

Figure 4:
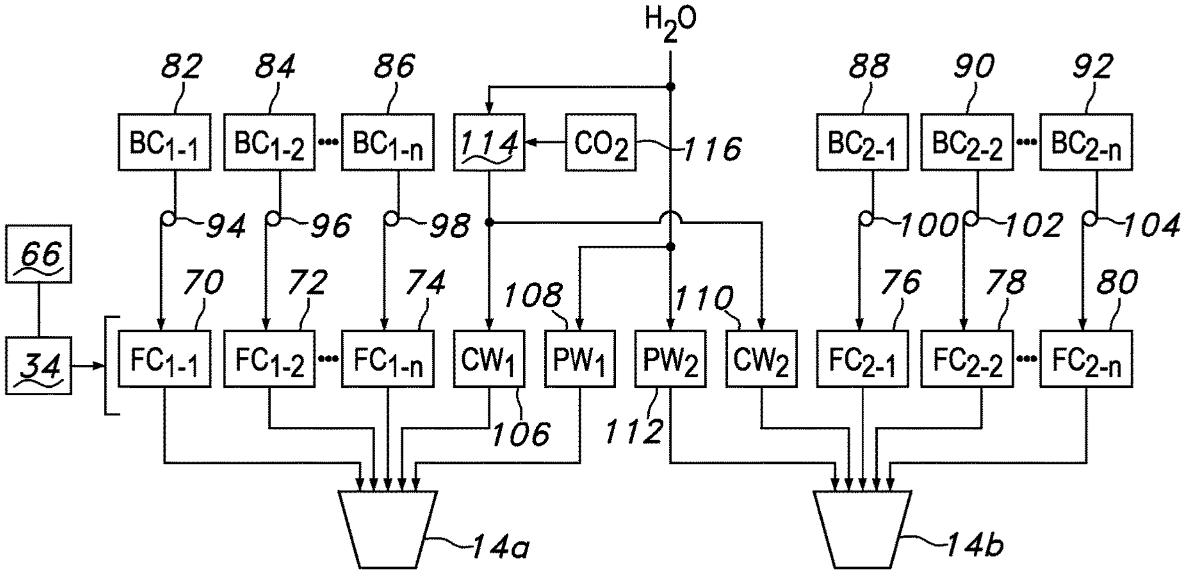
FIG. 4 is a block diagram of some components of one embodiment of a dispensing system according to the present invention.

FIG. 4 is a schematic diagram of one particular embodiment of dispenser 12 and related components. Dispenser 12 includes one or more flow control elements 70, 72, and 74 ($FC_{1-1}$, $FC_{1-2}$, and $FC_{1-n}$) in fluid communication with dispensing point 14*a* for controlling the flow of beverage components. Dispenser 12 also includes one or more flow control elements 76, 78, and 80 ($FC_{2-1}$, $FC_{2-2}$, and $FC_{2-n}$) in fluid communication with dispensing point 14*b* for controlling the flow of beverage components. The beverage components may be, for example and without limitation, syrups, concentrates, pre-mixed beverages, bonus flavors, additives, sweeteners, or any other beverage component. The number of flow control elements depicted is only an example, and more or fewer may be included.

The beverage components are supplied to dispensing point 14*a* from respective beverage component supplies 82, 84, and 86 ($BC_{1-1}$, $BC_{1-2}$, and $BC_{1-n}$). Similarly, beverage component supplies 88, 90, and 92 ($BC_{2-1}$, $BC_{2-2}$, and $BC_{2-n}$) supply dispensing point 14*b*. More or fewer beverage component supplies may be used. Supply pumps 94, 96, 98, 100, 102, and 104 (or any other suitable supply components) draw the beverage components from their respective containers for dispensing by dispenser 12.

As discussed above, some of the beverage components will supply both dispensing points 14*a* and 14*b*, and such duplicated beverage components may come from the same container or from separate containers, and may be supplied by the same supply pump or separate supply pumps. As one example, beverage component supplies 82 and 88, if they carry the same beverage component, may be the same container or separate containers.

In the particular example shown, the beverage component supplies are shown as being outside of beverage dispenser 12; however, some or all of the beverage component supplies may be located within beverage dispenser 12. The beverage component supplies may comprise any suitable source, for example and without limitation, bag-in-box containers, bulk storage, or cartridges.

Also shown are flow control elements 106 ($CW_1$) and 108 ($PW_1$) and 110 ($CW_2$) and 112 ($PW_2$), which are for the supply of carbonated water and plain water. Carbonated water is supplied from carbonator 114, which produces carbonated water from $CO_2$ delivered from $CO_2$ supply 116 and water received from a water supply (such as, without limitation, municipal or private water supply, or from an on-site water treatment or supply system). Plain water is delivered from the water supply.

Each of the flow control elements may comprise any suitable device or devices for controlling flow, for example and without limitation, an on/off valve, a flow control valve (whether flow rates are controlled electronically or otherwise), a metering valve, a metering pump, or any combination thereof. Each of the flow control elements need not be the same kind of device as the others, but some or all of them may be. The flow control elements are coupled to controller 34, which controls them to allow the appropriate beverages to be dispensed.

The beverage components, carbonated water, and plain water flow through supply lines. These lines may pass through heat exchangers (not shown) for cooling or heating, or not if ambient-temperature dispensing is desired. Heat exchanger elements need not be distinct, separate elements, but may be. For example, and without limitation, a common cold plate or common ice water bath may be used to cool each beverage component and water supply by running its respective line through the plate or bath.

In response to customer beverage dispense orders or selections, controller 34 controls the appropriate flow control element(s) to allow the appropriate beverage component and/or water to flow to dispensing point 14*a* or 14*b* for dispensing into a vessel, such as a cup.

The terms couple or coupled as used herein include direct coupling or indirect coupling through intermediate members.

Particular features of each of the embodiments disclosed herein may be interchanged with or added to those of the other embodiments.

Although the present invention has been described in detail, it should be understood that various changes, alterations, substitutions, additions, and modifications 23 could be made without departing from the intended scope of the invention, as defined in the following claims.

What is claimed is:

1. A method of dispensing beverages, comprising:

dispensing a first beverage into a first vessel at a first dispensing point;

automatically moving the first vessel from the first dispensing point to a second dispensing point and a second vessel to the first dispensing point;

topping-off the first vessel by dispensing more of the first beverage into the first vessel at the second dispensing point; and dispensing a second beverage different from the first beverage into the second vessel at the first dispensing point at least partially while topping-off the first vessel.

2. The method of claim 1, wherein dispensing the first beverage takes an initial pour time, automatically moving the first vessel takes a movement time, and topping-off takes a topping-off time, and wherein the movement time and the topping-off time together are less than or equal to the initial pour time.

3. The method of claim 1, wherein automatically moving the first and second vessels comprises advancing a conveyor on which the first and second vessels ride.

4. The method of claim 1, wherein the second beverage is not available at the second dispensing point.

5. The method of claim 1, wherein dispensing a first beverage into a first vessel at a first dispensing point comprises:

receiving a first beverage order;

determining whether the first beverage order is for the first beverage with a first pour time or the second beverage with a second pour time less than the first pour time; and dispensing the first beverage into the first vessel at the first dispensing point using a first initial pour time when the first beverage order is for the first beverage.

6. The method of claim 5, wherein topping-off the first vessel by dispensing more of the first beverage into the first vessel at the second dispensing point comprises topping-off the first vessel by dispensing more of the first beverage into the first vessel at the second dispensing point using a first topping-off time.

7. The method of claim 6, wherein dispensing a second beverage into the second vessel at the first dispensing point at least partially while topping-off the first vessel comprises:

receiving a second beverage order;

determining whether the second beverage order is for the first beverage or the second beverage;

dispensing the second beverage into the second vessel at the first dispensing point using a second initial pour time less than or equal to the first initial pour time when the second beverage order is for the second beverage.

8. The method of claim 7, comprising:

automatically moving the second vessel from the first dispensing point to the second dispensing point; and topping-off the second vessel by dispensing more of the second beverage into the second vessel at the second dispensing point using a second topping-off time greater than or equal to the first topping-off time.

9. A method of dispensing beverages, comprising:

receiving a first beverage order, determining whether the first beverage order is for a first beverage with a first pour time or a second beverage with a second pour time less than the first pour time;

dispensing the first beverage into a first vessel at a first dispensing point using a first initial pour time when the first beverage order is for the first beverage;

automatically moving the first vessel from the first dispensing point to a second dispensing point and a second vessel to the first dispensing point; and topping-off the first vessel by dispensing more of the first beverage into the first vessel at the second dispensing point using a first topping-off time when the first beverage order is for the first beverage.

10. The method of claim 9, comprising:

receiving a second beverage order;

determining whether the second beverage order is for the first beverage or the second beverage;

dispensing the second beverage into the second vessel at the first dispensing point using a second initial pour time less than or equal to the first initial pour time when the second beverage order is for the second beverage while topping-off the first vessel at the second dispensing point;

automatically moving the second vessel from the first dispensing point to the second dispensing point; and topping-off the second vessel by dispensing more of the second beverage into the second vessel at the second dispensing point using a second topping-off time greater than or equal to the first topping-off time when the second beverage order is for the second beverage.

11. The method of claim 10, comprising:

dispensing the second beverage into the first vessel at the first dispensing point using the second initial pour time less than or equal to the first initial pour time when the first beverage order is for the second beverage;

automatically moving the first vessel from the first dispensing point to the second dispensing point and a second vessel to the first dispensing point; and topping-off the first vessel by dispensing more of the second beverage into the first vessel at the second dispensing point using the second topping-off time greater than or equal to the first topping-off time when the first beverage order is for the second beverage.

12. The method of claim 11, comprising:

dispensing the first beverage into the second vessel at the first dispensing point using the first initial pour time when the second beverage order is for the first beverage while topping-off the first vessel at the second dispensing point;

automatically moving the second vessel from the first dispensing point to the second dispensing point; and topping-off the second vessel by dispensing more of the first beverage into the second vessel at the second dispensing point using the first topping-off time when the second beverage order is for the first beverage.

* * * * *